US012771468B2

(12) United States Patent
Aoyama et al.

(10) Patent No.: US 12,771,468 B2
(45) Date of Patent: Oct. 20, 2026

(54) CONDITION MONITORING DEVICE, GROUND WIRELESS DEVICE, ON-BOARD WIRELESS DEVICE, FAILURE RISK DETERMINATION METHOD, CONTROL CIRCUIT, AND STORAGE MEDIUM

(71) Applicant: Mitsubishi Electric Corporation, Tokyo (JP)

(72) Inventors: Tetsuya Aoyama, Tokyo (JP); Yuji Miyake, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 569 days.

(21) Appl. No.: 18/213,045

(22) Filed: Jun. 22, 2023

(65) Prior Publication Data

US 2023/0336264 A1 Oct. 19, 2023

Related U.S. Application Data

(63) Continuation of application No. PCT/JP2021/007408, filed on Feb. 26, 2021.

(51) Int. Cl.

| | |
|---|---|
| ***H04J 3/14*** | (2006.01) |
| ***H04J 3/06*** | (2006.01) |
| *H04L 67/12* | (2022.01) |

(52) U.S. Cl.
CPC *H04J 3/14* (2013.01); *H04J 3/06* (2013.01); *H04L 67/12* (2013.01)

(58) Field of Classification Search
CPC ..................................... H04J 3/14; H04J 3/06
USPC ........................................................ 370/252
See application file for complete search history.

(56) References Cited

U.S. PATENT DOCUMENTS

| | | | |
|---|---|---|---|
| 9,878,722 B2 | 1/2018 | Yamaguchi et al. | |
| 2016/0332647 A1* | 11/2016 | Yanai | B61L 15/0062 |
| 2019/0028214 A1 | 1/2019 | Suzuki et al. | |
| 2019/0219680 A1* | 7/2019 | Sugae | G01S 11/16 |

FOREIGN PATENT DOCUMENTS

| | | |
|---|---|---|
| JP | 2011-199689 A | 10/2011 |
| JP | 2016-159784 A | 9/2016 |
| JP | 2017-88140 A | 5/2017 |
| JP | 6474564 B2 | 2/2019 |
| WO | WO 2017/130317 A1 | 8/2017 |

OTHER PUBLICATIONS

International Search Report (PCT/ISA/210) issued for PCT/JP2021/007408 mailed on May 18, 2021.
Japanese Notification of Reason for Refusal dated Oct. 18, 2022 in Japanese Patent Application No. 2022-555185.

* cited by examiner

*Primary Examiner* — Faisal Choudhury
(74) *Attorney, Agent, or Firm* — Birch, Stewart, Kolasch & Birch, LLP

(57) ABSTRACT

A condition monitoring device monitors conditions of ground wireless devices and an on-board wireless device which constitute a wireless train control system adopting a time-division multiplexing scheme. The device includes: a wired connection unit that acquires a result of measurement of an error between a transmission timing of a signal in the ground wireless device and a reference timing, from the ground wireless device; and a deteriorated condition determination unit that determines a performance deteriorated condition of the ground wireless device on the basis of the error.

11 Claims, 11 Drawing Sheets

462

| GROUND WIRELESS DEVICE IDENTIFIER | PATH INFORMATION |
|---|---|
| 200 | 210 |
| 210 | 200 |
| 220 | 230 |
| 230 | 220 |

CONDITION MONITORING DEVICE, GROUND WIRELESS DEVICE, ON-BOARD WIRELESS DEVICE, FAILURE RISK DETERMINATION METHOD, CONTROL CIRCUIT, AND STORAGE MEDIUM

CROSS-REFERENCE TO RELATED APPLICATION

This application is a continuation application of International Application PCT/JP2021/007408, filed on Feb. 26, 2021, and designating the U.S., the entire contents of which are incorporated herein by reference.

BACKGROUND OF THE INVENTION

1. Field of the Invention

The present disclosure relates to a condition monitoring device, a ground wireless device, an on-board wireless device, a failure risk determination method, a control circuit, and a storage medium, the condition monitoring device monitoring a condition of a wireless device in a wireless train control system that controls a train through use of radio communication.

2. Description of the Related Art

A time-division multiplexing scheme is one of multiplexing schemes in which one transmission path is used simultaneously by a plurality of wireless devices. A wireless communication system adopting the time-division multiplexing scheme needs to synchronize transmission/reception timings of all the wireless devices in the system by time synchronization.

As an example of the wireless communication system adopting the time-division multiplexing scheme, a wireless communication system applied to a wireless train control system is known. In this wireless communication system, within a communication area including a plurality of ground wireless devices, a mobile object equipped with an on-board wireless device continues communication while performing a handover for switching the ground wireless device to be a connection destination with movement of the mobile object. Also, this wireless communication system synchronizes transmission/reception timings between the ground wireless devices and between the ground wireless device and the on-board wireless device in order to achieve switching of a frequency channel to be used for signal transmission and reception and avoidance of communication disruption due to the handover.

In the wireless train control system, the ground wireless device placed along a railway line and the on-board wireless device installed on a train perform wireless communication with each other, so that traffic operations and speed of the train are controlled on the basis of information transmitted by the wireless communication. For the wireless train control system, a wireless communication scheme between the ground wireless device and the on-board wireless device is not defined, but a system using radio in a 2.4 GHz band is the mainstream. In the wireless train control system using the 2.4 GHz band, on the ground of its radio characteristics, the ground wireless devices are placed every several 100 meters along a railway line. Moreover, in general, the on-board wireless devices are installed in cars at both ends for the entire train composition, that is, in a lead car and a last car.

For maintenance and device replacement of these many ground wireless devices and on-board wireless devices, it is necessary to formulate maintenance plans and secure replacements, and so detection of a change in condition of the wireless device is important. In addition, considering differences between installation environments of the wireless devices and additional installation or replacement of the wireless device in its device operation, the wireless devices have their respective individual differences in details of secular changes, that is, component deterioration and an environmental change due to iron powder, wind pressure, or the like, and the speeds of the secular changes from a long-term perspective. In recent years, condition-based maintenance that determines a timing of maintenance of equipment according to a condition has attracted attention. For example, Patent Literature 1 (Japanese Patent No. 6474564) discloses a system that collects signals indicating measurements from a plurality of types of physical quantity detection means provided in facilities in a transformation installation, and determines a deteriorated condition of the facilities using, as an index, a residual obtained by performing statistical processing on the measurements collected.

The system disclosed in Patent Literature 1 determines the deteriorated condition of the facility by analyzing temperature, pressure, electric current, and ambient temperature of the facility. However, in the wireless train control system requiring time synchronization among the wireless devices, only physical quantities obtained from a single facility, such as the temperature, pressure, electric current, and ambient temperature of the facility cannot determine a failure risk for a communication service of the entire system.

The present disclosure has been made in view of the above circumstances, and an object of the present disclosure is to provide a condition monitoring device capable of extracting a device that requires some maintenance associated with a secular change in a wireless train control system.

SUMMARY OF THE INVENTION

In order to solve the above-mentioned problem and achieve the object, the present disclosure provides a condition monitoring device that monitors conditions of ground wireless devices and an on-board wireless device which constitute a wireless train control system adopting a time-division multiplexing scheme, the condition monitoring device comprising: a wired connection circuit to acquire a result of measurement of an error between a transmission timing of a signal in the ground wireless device and a reference timing, from the ground wireless device; and a deteriorated condition determination circuit to determine a performance deteriorated condition of the ground wireless device, on the basis of the error.

DETAILED DESCRIPTION OF THE PREFERRED EMBODIMENTS

Hereinafter, a condition monitoring device, a ground wireless device, an on-board wireless device, a failure risk determination method, a control circuit, and a storage medium according to embodiments of the present disclosure will be described in detail with reference to the drawings.

First Embodiment

Figure 1:
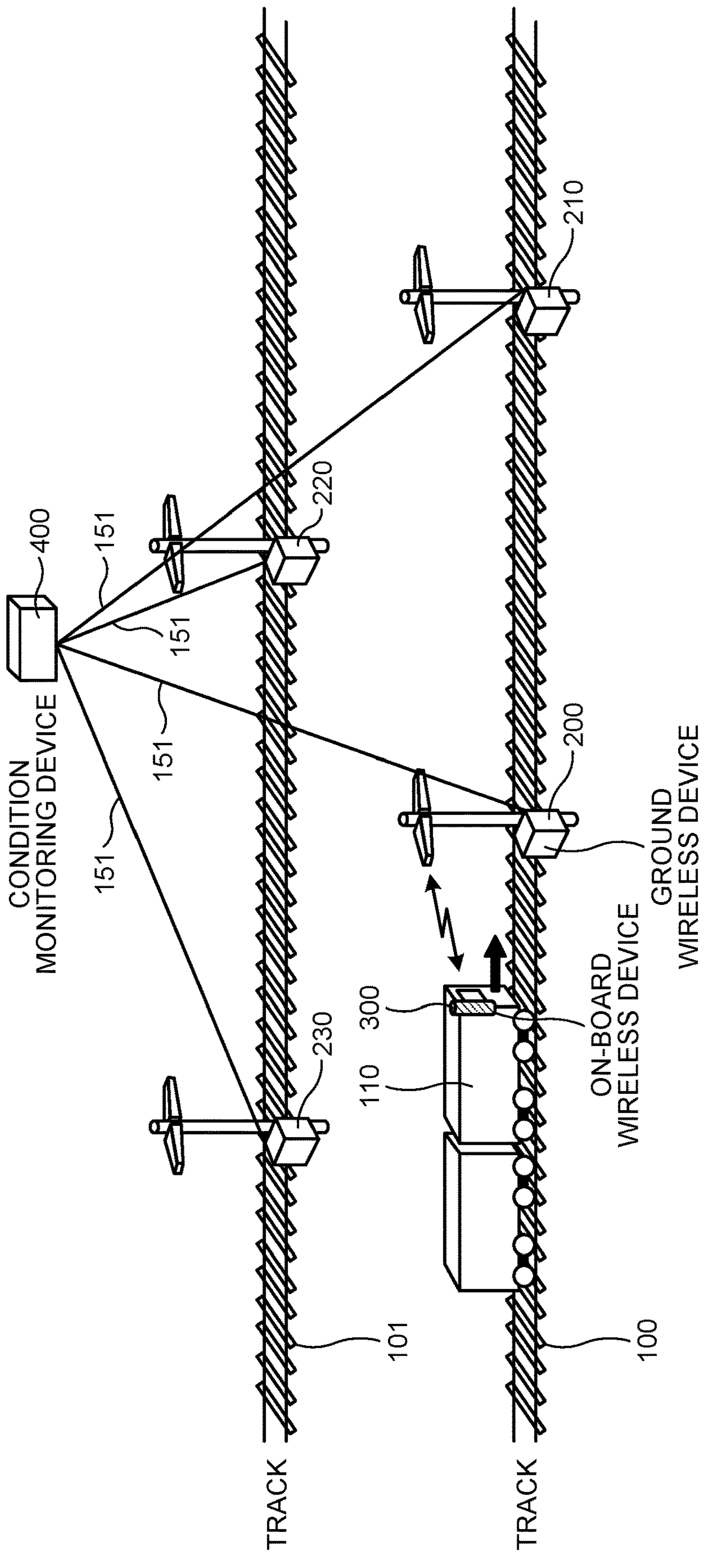
FIG. 1 is a diagram illustrating an example of a configuration of a wireless train control system according to a first embodiment.

FIG. 1 is a diagram illustrating an example of a configuration of a wireless train control system according to a first embodiment. As illustrated in FIG. 1, the wireless train control system according to the first embodiment includes ground wireless devices 200, 210, 220, and 230 placed on the ground, an on-board wireless device 300 installed in a train 110, and a condition monitoring device 400. The ground wireless devices 200 and 210 are placed along a railway track 100, and the ground wireless devices 220 and 230 are placed along a railway track 101. The ground wireless devices 200 to 230 and the on-board wireless device 300 make up a wireless communication system to which a time-division multiplexing scheme is applied.

In the wireless train control system illustrated in FIG. 1, the on-board wireless device 300 installed in the train 110 moves on the track 100 while transmitting control information to and receiving control information from any one of the ground wireless devices 200 to 230. The ground wireless device for which the control information is transmitted and received by the on-board wireless device 300 is a ground wireless device closest to an antenna oriented surface on one and the same track. The antenna oriented surface is set to face in a direction of travel of the train indicated by a bold arrow, and in the case of a positional relationship illustrated in FIG. 1, the on-board wireless device 300 transmits the control information to and receives the control information from the ground wireless device 200.

The condition monitoring device 400 is connected to each of the ground wireless devices 200 to 230 via a wired network 151 to mediate transmission of the control information and monitor conditions of the on-board wireless device 300 and the ground wireless devices 200 to 230. Note that in the drawings used in the following description, the same reference symbols denote the same or corresponding parts.

Figure 2:
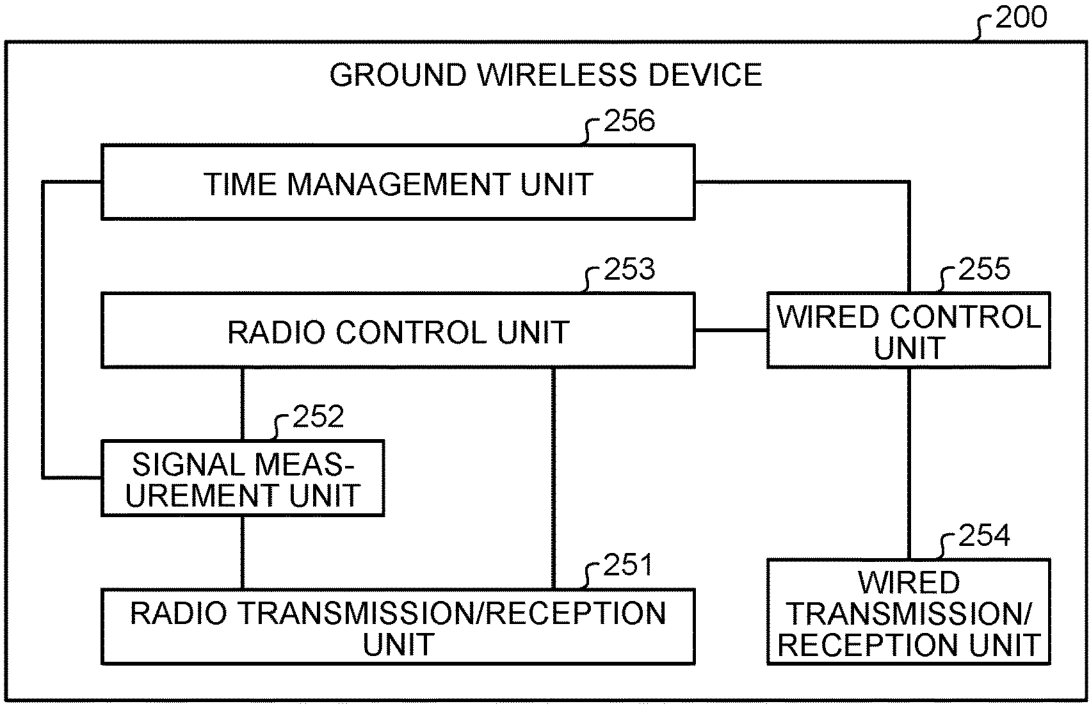
FIG. 2 is a diagram illustrating an example of a functional configuration of a ground wireless device.

FIG. 2 is a diagram illustrating an example of a functional configuration of the ground wireless device 200. The ground wireless device 200 includes: a radio transmission/reception unit or circuit 251 that transmits a radio signal to and receives a radio signal from the on-board wireless device 300; a signal measurement unit or circuit 252 that measures a radio signal timing; a radio control unit or circuit 253 that controls a radio line; a wired transmission/reception unit or circuit 254 that transmits a signal to and receives a signal from the condition monitoring device 400, a wired control unit or circuit 255 that controls a wired line, and a time management unit or circuit 256 that manages an internal time of the ground wireless device 200. The radio signal timing measured by the signal measurement unit 252 refers to a timing at which the ground wireless device 200 transmits a radio signal and timings at which the other ground wireless devices, that is, the ground wireless devices 210 to 230 transmit their respective radio signals. The time management unit 256 has a function of correcting the managed internal time on the basis of information acquired from the outside. A functional configuration of each of the ground wireless devices 210 to 230 is substantially the same as that of the ground wireless device 200.

Figure 3:
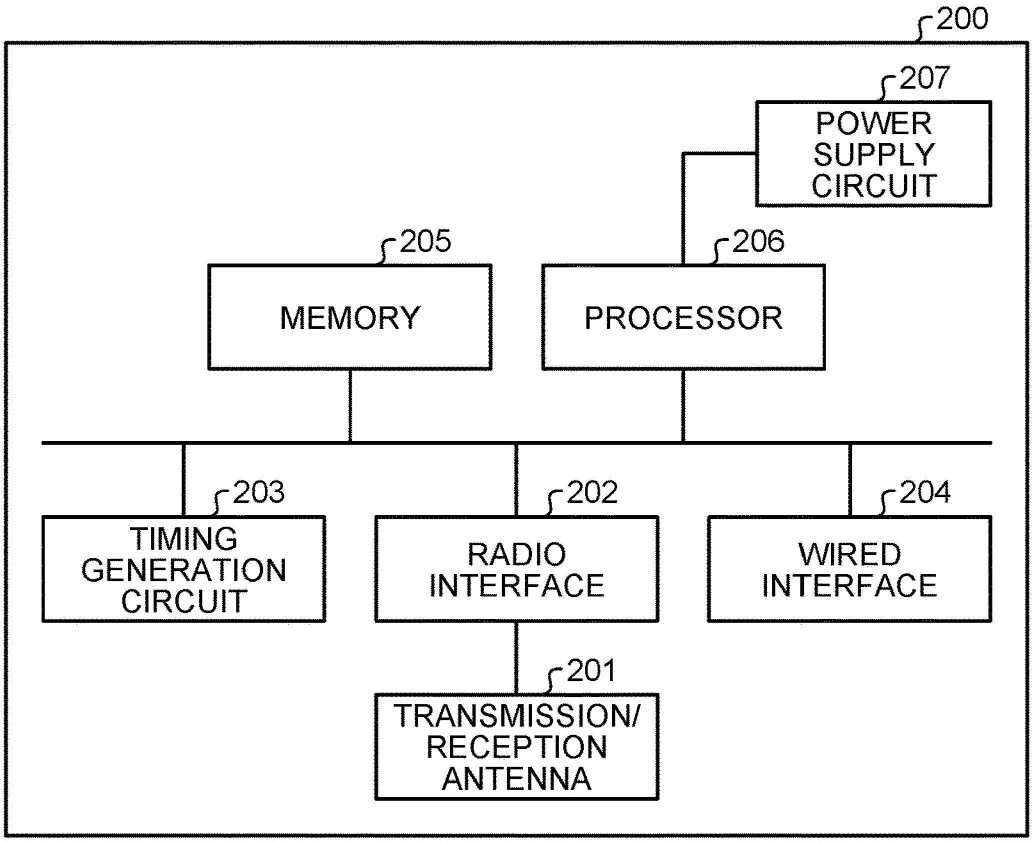
FIG. 3 is a diagram illustrating an example of a hardware configuration of the ground wireless device.

FIG. 3 is a diagram illustrating an example of a hardware configuration of the ground wireless device 200. The ground wireless device 200 includes a transmission/reception antenna 201, a radio interface 202, a timing generation circuit 203, a wired interface 204, a memory 205, a processor 206, and a power supply circuit 207.

The radio interface 202 is a communication circuit that is connected to the transmission/reception antenna 201 and performs radio signal processing. The wired interface 204 is a circuit that is connected to the wired network 151 and performs communication processing with the condition monitoring device 400. The timing generation circuit 203 is a circuit that generates a timing at which each unit of the ground wireless device 200 should execute processing, and generates, for example, a clock signal. The memory 205 is, for example, a non-volatile or volatile semiconductor memory such as a random access memory (RAM), a read only memory (ROM), or a flash memory, a magnetic disk, or the like. The processor 206 is a central processing unit (CPU), a microprocessor, or the like. The power supply circuit 207 is a circuit that supplies electric power to the units of the ground wireless device 200. Note that the ground wireless devices 210 to 230 each also have a similar hardware configuration.

The radio transmission/reception unit 251 illustrated in FIG. 2 is implemented by the transmission/reception antenna 201 and the radio interface 202. The wired transmission/reception unit 254 illustrated in FIG. 2 is implemented by the wired interface 204.

The signal measurement unit 252, the radio control unit 253, the wired control unit 255, and the time management unit 256 illustrated in FIG. 2 are implemented by the processor 206 executing a program for realizing operations of these units. The functions of the signal measurement unit 252, the radio control unit 253, the wired control unit 255, and the time management unit 256 are described as a program and stored in the memory 205. The processor 206 reads out and executes the program stored in the memory 205 to thereby implement the functions of the signal measurement unit 252, the radio control unit 253, the wired control unit 255, and the time management unit 256. It can also be said that the program causes a computer to execute a procedure or method for the signal measurement unit 252, the radio control unit 253, the wired control unit 255, and the time management unit 256. The memory 205 is also used for a temporary memory when the processor 206 executes various kinds of processings.

Although FIG. 3 illustrates the hardware configuration in the case where the ground wireless device 200 is implemented through the use of the processor 206 and the memory 205 that general-purpose components, the ground wireless device 200 can also be implemented through the use of a dedicated processing circuit instead of the processor 206 and the memory 205.

Figure 4:
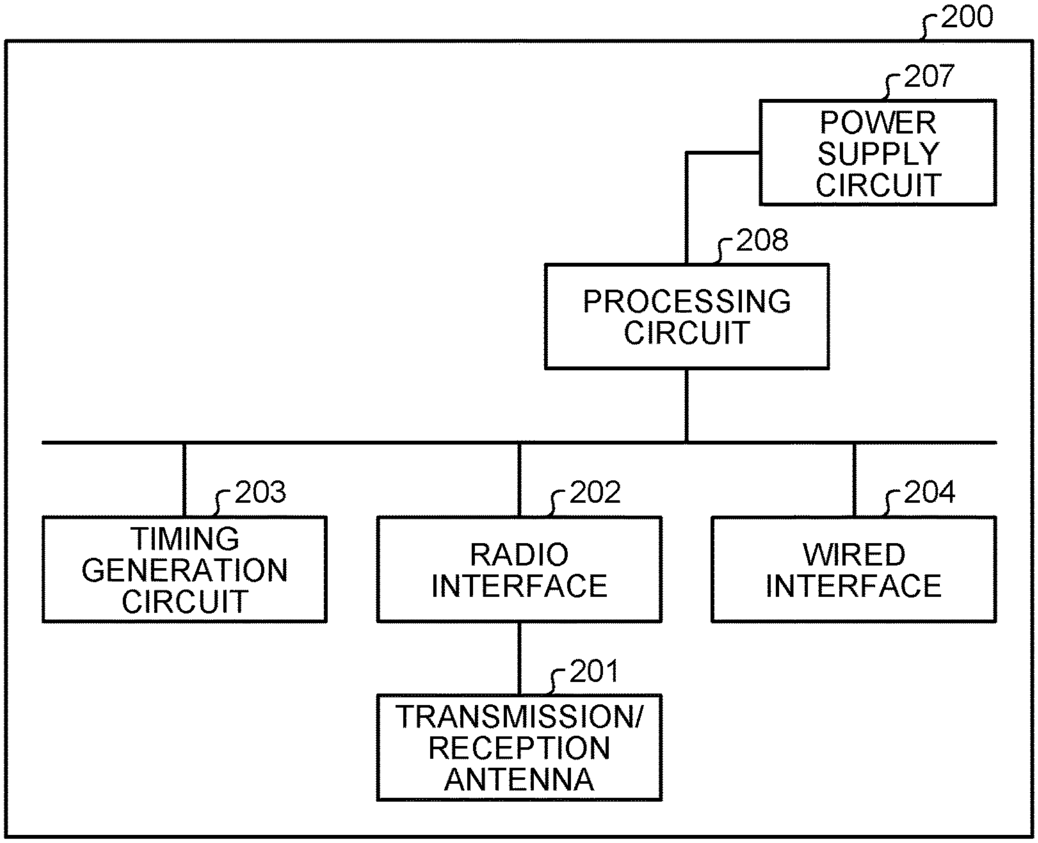
FIG. 4 is a diagram illustrating another example of the hardware configuration of the ground wireless device.

FIG. 4 is a diagram illustrating another example of the hardware configuration of the ground wireless device 200. The hardware illustrated in FIG. 4 is obtained by replacing the memory 205 and the processor 206 illustrated in FIG. 3 with a dedicated processing circuit 208. The processing circuit 208 is a single circuit, a composite circuit, an application specific integrated circuit (ASIC), a field programmable gate array (FPGA), or a circuit obtained by a combination thereof. In a case where the ground wireless device 200 is implemented by the hardware configuration illustrated in FIG. 4, the signal measurement unit 252, the radio control unit 253, the wired control unit 255, and the time management unit 256 are implemented by the processing circuit 208. Although the ground wireless device 200 has been described, the ground wireless devices 210 to 230 each have a similar hardware configuration as well.

Note that a part of the functions of the signal measurement unit 252, the radio control unit 253, the wired control unit 255, and the time management unit 256 may be implemented by a dedicated processing circuit corresponding to the processing circuit 208 illustrated in FIG. 4, while the rest part thereof are implemented by general-purpose memory and processor corresponding to the memory 205 and the processor 206 illustrated in FIG. 3.

Figure 5:
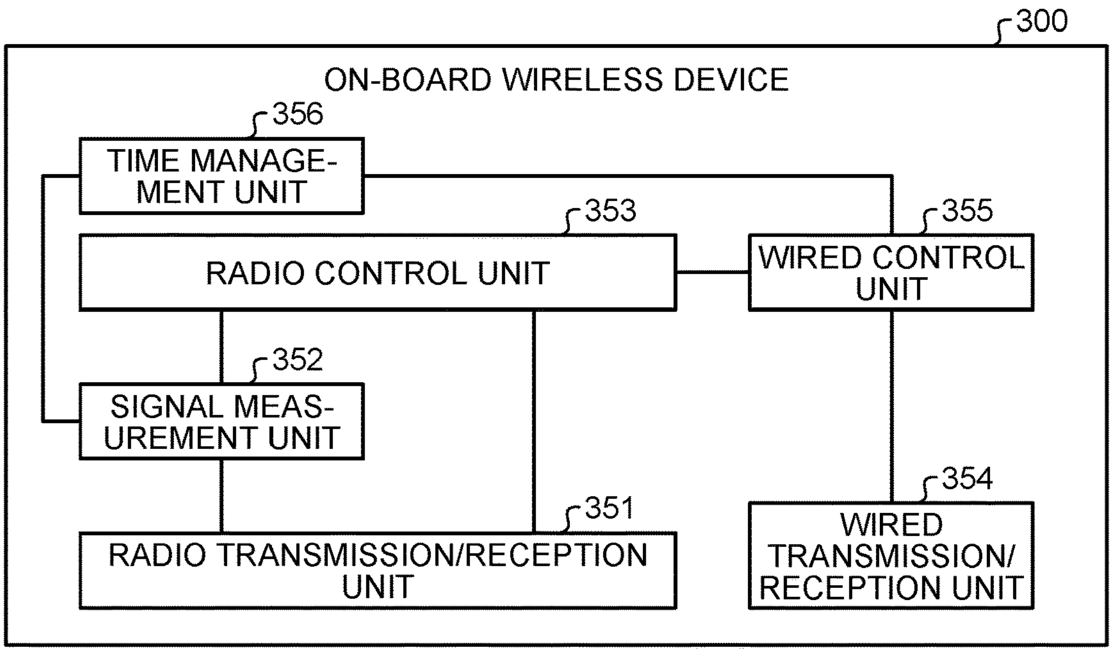
FIG. 5 is a diagram illustrating an example of a functional configuration of an on-board wireless device.

FIG. 5 is a diagram illustrating an example of a functional configuration of the on-board wireless device 300. The on-board wireless device 300 includes a radio transmission/reception unit or circuit 351 that transmits a radio signal to and receives a radio signal from the ground wireless devices 200 to 230, a signal measurement unit or circuit 352 that measures a radio signal timing, a radio control unit or circuit 353 that controls a radio line, a wired transmission/reception unit or circuit 354 that transmits a signal to and receives a signal from another device (not illustrated) installed in the train 110, a wired control unit or circuit 355 that controls a wired line, and a time management unit or circuit 356 that manages an internal time of the on-board wireless device 300.

Figure 6:
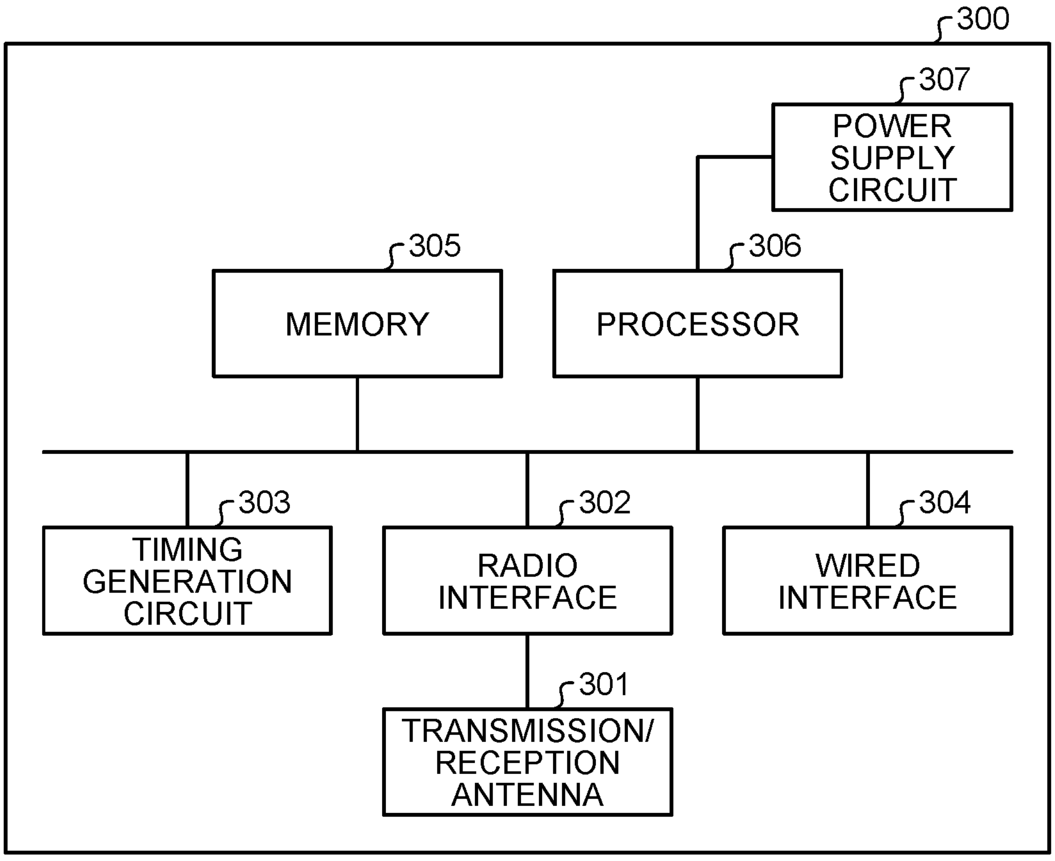
FIG. 6 is a diagram illustrating an example of a hardware configuration of the on-board wireless device.

FIG. 6 is a diagram illustrating an example of a hardware configuration of the on-board wireless device 300. The on-board wireless device 300 is composed of a transmission/reception antenna 301, a radio interface 302, a timing generation circuit 303, a wired interface 304, a memory 305, a processor 306, and a power supply circuit 307.

The radio interface 302 is a communication circuit that is connected to the transmission/reception antenna 301 and performs radio signal processing. The wired interface 304 is a circuit that is connected to a wired network installed in the train 110 and performs communication processing with another or other devices in the train 110. The timing generation circuit 303 is a circuit that generates a timing at which each unit of the on-board wireless device 300 executes processing, and generates, for example, a clock signal. The memory 305 is, for example, a non-volatile or volatile semiconductor memory such as a RAM, a ROM, or a flash memory, a magnetic disk, or the like. The processor 306 is a CPU, a microprocessor, or the like. The power supply circuit 307 is a circuit that supplies electric power to the units of the on-board wireless device 300.

The radio transmission/reception unit 351 illustrated in FIG. 5 is implemented by the transmission/reception antenna 301 and the radio interface 302. The wired transmission/reception unit 354 illustrated in FIG. 5 is implemented by the wired interface 304.

The signal measurement unit 352, the radio control unit 353, the wired control unit 355, and the time management unit 356 illustrated in FIG. 5 are implemented by the processor 306 executing a program for operation of these units. The functions of the signal measurement unit 352, the radio control unit 353, the wired control unit 355, and the time management unit 356 are described as a program and the program is stored in the memory 305. The processor 306 reads out and executes the program stored in the memory 305 to thereby implement the functions of the signal measurement unit 352, the radio control unit 353, the wired control unit 355, and the time management unit 356. It can also be said that the program causes a computer to execute a procedure or method for the signal measurement unit 352, the radio control unit 353, the wired control unit 355, and the time management unit 356. The memory 305 is also used for a temporary memory when the processor 306 executes various kinds of processings.

Although FIG. 6 illustrates the hardware configuration in the case where the on-board wireless device 300 is implemented through the use of the processor 306 and the memory 305 that are general-purpose components, the on-board wireless device 300 can also be implemented through the use of a dedicated processing circuit instead of the processor 306 and the memory 305.

Figure 7:
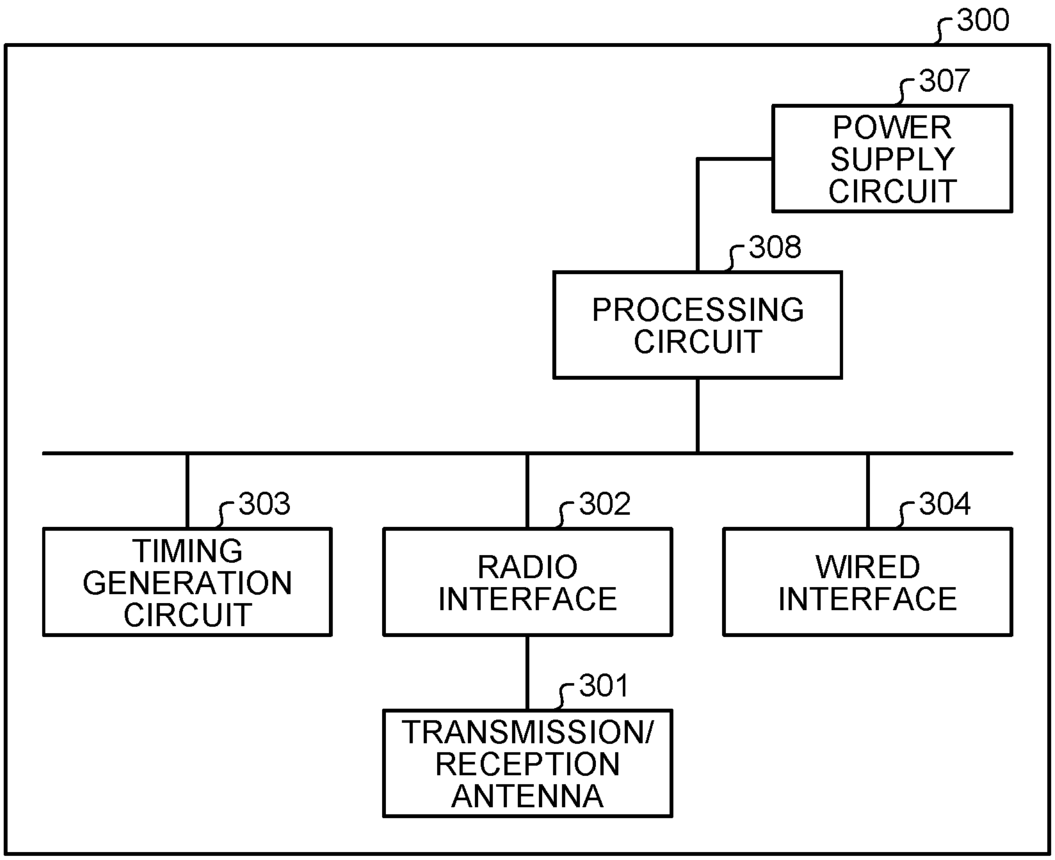
FIG. 7 is a diagram illustrating another example of the hardware configuration of the on-board wireless device.

FIG. 7 is a diagram illustrating another example of the hardware configuration of the on-board wireless device 300. The hardware configuration illustrated in FIG. 7 is obtained by replacing the memory 305 and the processor 306 illustrated in FIG. 6 with a dedicated processing circuit 308. The processing circuit 308 is a single circuit, a composite circuit, an ASIC, an FPGA, or a circuit obtained by a combination thereof. In a case where the on-board wireless device 300 is implemented by the hardware configuration illustrated in FIG. 7, the signal measurement unit 352, the radio control unit 353, the wired control unit 355, and the time management unit 356 are implemented by the processing circuit 308.

Note that a part of the functions of the signal measurement unit 352, the radio control unit 353, the wired control unit 355, and the time management unit 356 may be implemented by a dedicated processing circuit corresponding to the processing circuit 308 illustrated in FIG. 7, while the rest part thereof is implemented by general-purpose memory and processor corresponding to the memory 305 and the processor 306 illustrated in FIG. 6.

Figure 8:
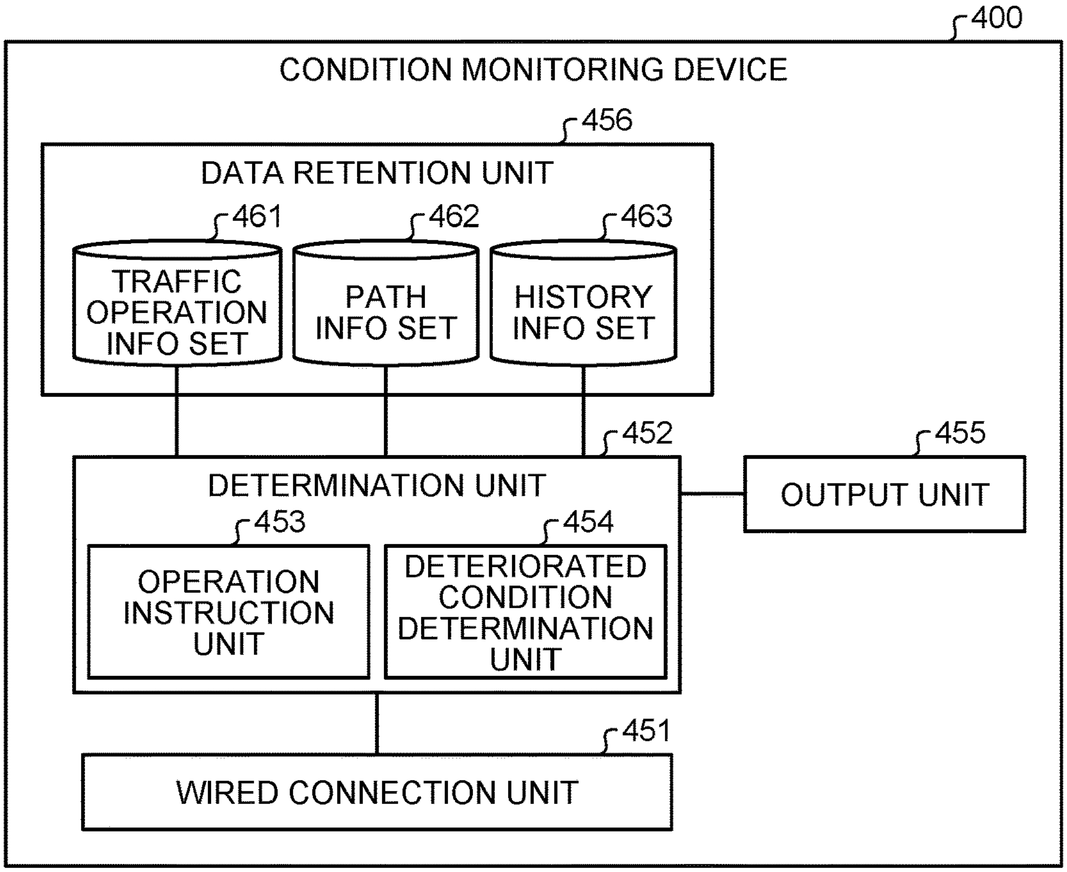
FIG. 8 is a diagram illustrating an example of a functional configuration of a condition monitoring device.

FIG. 8 is a diagram illustrating an example of a functional configuration of the condition monitoring device 400. The condition monitoring device 400 includes a wired connection unit or circuit 451, a determination unit circuit 452 that determines conditions of the ground wireless devices 200 to 230, an output unit or circuit 455 that outputs a result of determination of the determination unit 452, and a data retention unit or circuit 456. The determination unit 452 includes an operation instruction unit or circuit 453 that determines a traffic operation status of the train and issues an operation instructions to the ground wireless devices 200 to 230, and a deteriorated condition determination unit or circuit 454 that determines deteriorated conditions of the ground wireless devices 200 to 230. The data retention unit 456 retains a traffic operation information set 461 in which traffic operation information of the train is recorded, a path information set 462 in which a positional relationship of the ground wireless devices 200 to 230 is recorded, and a history information set 463 in which results of measurement in the past are recorded. The results of measurement recorded in the history information set 463 are results of measurement obtained by the signal measurement unit 252 which have been acquired from the ground wireless devices 200 to 230.

Figure 9:
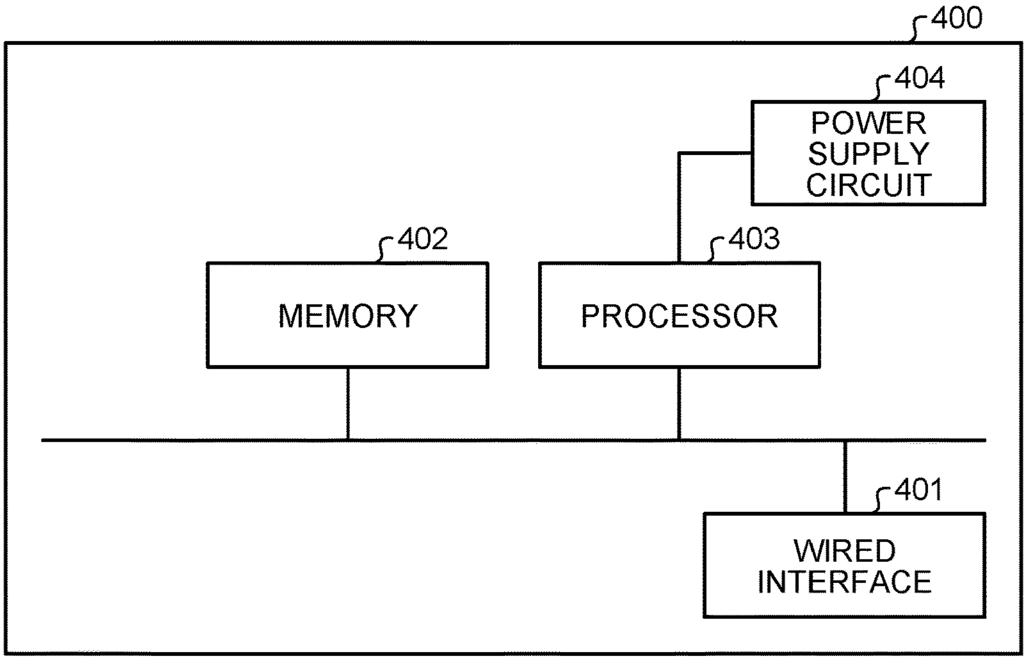
FIG. 9 is a diagram illustrating an example of a hardware configuration of the condition monitoring device.

FIG. 9 is a diagram illustrating an example of a hardware configuration of the condition monitoring device 400. The condition monitoring device 400 is composed of a wired interface 401, a memory 402, a processor 403, and a power supply circuit 404.

The wired interface 401 is a circuit that is connected to the wired network 151 and performs communication processing with the ground wireless devices 200 to 230. The memory 402 is, for example, a non-volatile or volatile semiconductor memory such as a RAM, a ROM, or a flash memory, a magnetic disk, or the like. The processor 403 is a CPU, a microprocessor, or the like. The power supply circuit 404 is a circuit that supplies electric power to each unit of the condition monitoring device 400.

The wired connection unit 451 illustrated in FIG. 8 is implemented by the wired interface 401. The determination unit 452 and the output unit 455 illustrated in FIG. 8 are implemented by the processor 403 executing a program for performing operations of these units. The functions of the determination unit 452 and the output unit 455 are described as a program and the program is stored in the memory 402. The processor 403 implements the functions of the determination unit 452 and the output unit 455 by reading and executing the program stored in the memory 402. It can also be said that the program causes a computer to execute a procedure or method for the determination unit 452 and the output unit 455. The memory 402 is also used for a temporary memory when the processor 403 executes various kinds of processings.

Although FIG. 9 illustrates the hardware configuration in the case where the condition monitoring device 400 is implemented through the use of the processor 403 and the memory 402 that are general-purpose processor and memory, the condition monitoring device 400 can also be implemented through the use of a dedicated processing circuit instead of the processor 403 and the memory 402.

Figure 10:
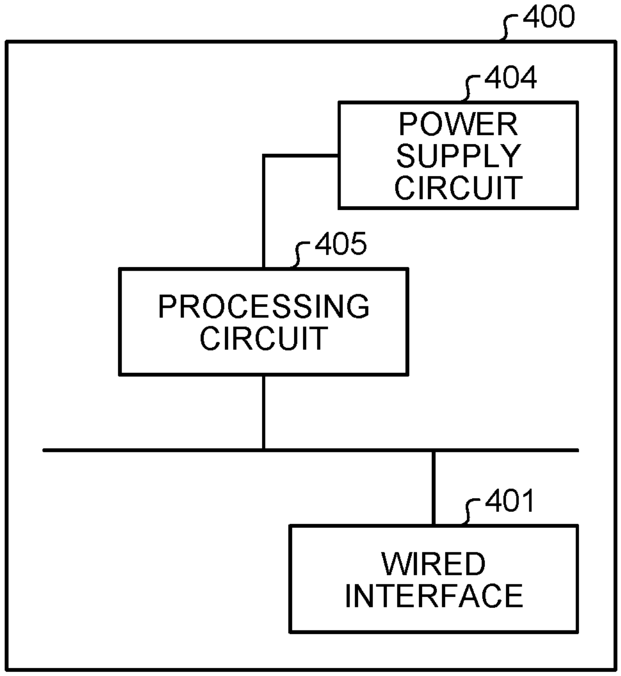
FIG. 10 is a diagram illustrating another example of the hardware configuration of the condition monitoring device.

FIG. 10 is a diagram illustrating another example of the hardware configuration of the condition monitoring device 400. The hardware configuration illustrated in FIG. 10 is obtained by replacing the memory 402 and the processor 403 illustrated in FIG. 9 with a dedicated processing circuit 405. The processing circuit 405 is a single circuit, a composite circuit, an ASIC, an FPGA, or a circuit obtained by a combination thereof. In a case where the condition monitoring device 400 is implemented by the hardware configuration illustrated in FIG. 10, the determination unit 452 and the output unit 455 are implemented by the processing circuit 405.

Note that a part of the functions of the determination unit 452 and the output unit 455 may be implemented by a dedicated processing circuit corresponding to the processing circuit 405 illustrated in FIG. 10, while the rest part thereof is implemented by general-purpose memory and processor corresponding to the memory 402 and the processor 403 illustrated in FIG. 9.

Next, operations of the ground wireless devices 200 to 230, the on-board wireless device 300, and the condition monitoring device 400 according to the present embodiment will be described.

The on-board wireless device 300 is connected to the ground wireless device 200 to perform transmission and reception of control information. The on-board wireless device 300 continues the transmission and reception of the control information while switching the ground wireless device that is a connection destination in association with movement of the train 110. In a case of the time-division multiplexing scheme, not only the ground wireless device 200 and the on-board wireless device 300 but also all the ground wireless devices synchronize their internal times, thereby making it possible to realize switching of the connection destination of the on-board wireless device 300. The internal times are used to determine the transmission/reception timings in the ground wireless devices 200 to 230 and the on-board wireless device 300. Therefore, deviation occurs in the transmission/reception timings of signals when the internal times are not synchronized among the devices, thereby leading to some possibility of a communication failure condition. What is used for a means for time synchronization is, by way of example, time synchronization using an absolute time obtained with the use of a global positioning system (GPS) or the like, time synchronization based on a relative time using a radio signal between the ground wireless device 200 and the on-board wireless device 300 or between the ground wireless device 200 and another ground wireless device, or a combination of these time synchronizations. Performing time synchronization can synchronize the signal transmission timings of the ground wireless devices 200 to 230 and the on-board wireless device 300, and achieve highly reliable wireless communication. Note that, in the following description, time synchronization may be referred to as time correction case by case.

In addition, the signal measurement unit 252 of the ground wireless device 200 can monitor the transmission timing of the ground wireless device 210 by receiving a signal transmitted by the ground wireless device 210 via the radio transmission/reception unit 251. Similarly, the ground wireless devices 210 to 230 can each monitor the transmission timing of another one of the ground wireless devices located in a range where the ground wireless device can monitor a signal. There may be two or more ground wireless devices located in the range where a certain one of the ground wireless devices can monitor a signal.

In order to monitor a timing difference, that is, a time gap, with respect to an adjacent ground wireless device for a long period of time, it is preferable to temporarily stop a function of time correction. Therefore, in the present embodiment, the time correction is disabled during a period of time when the train is out of service such as at night, or during a period of time within the train service hours when the on-board wireless device does not exist in a coverage area of each ground wireless device. The condition monitoring device 400 determines a failure risk due to a secular change of each ground wireless device on the basis of an amount of time gap measured by each of the ground wireless devices 200 to 230 in a period in which the time correction is disabled.

A method of disabling and enabling the time correction of the ground wireless devices 200 to 230 will be described. The ground wireless devices 200 to 230 disable and enable the time correction in accordance with an instruction from the condition monitoring device 400. As an example, an operation of disabling the time correction of the ground wireless device 200 and an operation of enabling the time correction thereof will be described.

Figure 11:
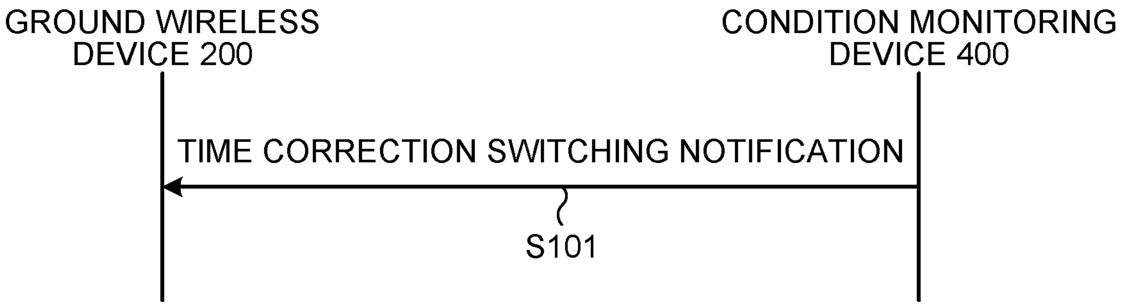
FIG. 11 is a sequence diagram illustrating an example of an operation that disables time correction of the ground wireless device and an operation that enables the time correction.

FIG. 11 is a sequence diagram illustrating an example of the operation of disabling the time correction of the ground wireless device 200 and the operation of enabling the time correction thereof.

In the condition monitoring device 400, the operation instruction unit 453 of the determination unit 452 determines whether or not to disable the time correction of the ground wireless device 200 on the basis of the traffic operation information set 461. That is, the operation instruction unit 453 refers to the traffic operation information set 461 and monitors whether or not an operating state of the entire system has changed from a state of "in operation" to another state of "not in operation". The "operating state of the entire system" means an operating state of a railroad system, and is a state of "in operation" in a case where the train is in service, or in other words, in a case where at least one of the ground wireless devices communicates with the on-board wireless device 300 in the wireless train control system. When detecting the fact that the operating state of the entire system has changed from the state of "in operation" to the state of "not in operation", the operation instruction unit 453 transmits a time correction switching notification to the ground wireless device 200 as illustrated in FIG. 11 (step S101). The time correction switching notification in this case includes information indicating that the time correction is disabled.

Upon receiving the time correction switching notification including the information indicating that the time correction is disabled, the ground wireless device 200 disables the time correction. Thereafter, until receiving a time correction switching notification including information indicating that the time correction is enabled, the ground wireless device 200 continues monitoring a difference between the internal time managed by the time management unit 256 in the ground wireless device 200 and the time managed by the other one of the ground wireless devices. The difference between the internal time and the time managed by the other ground wireless device is calculated on the basis of the transmission timing of the other ground wireless device. The ground wireless devices 200 to 230 each transmit a control signal in predetermined cycles. Therefore, the signal measurement unit 252 of the ground wireless device 200 measures an error between the timing at which the ground wireless device 200 transmits the control signal and the timing at which the other ground wireless device, for example, the ground wireless device 210 transmits the control signal, and calculates the difference between the internal time managed by the time management unit 256 and the time managed by the other ground wireless device using the measured error.

Moreover, when referring to the traffic operation information set 461 and detecting the fact that the operating state of the entire system has changed from a state of "not in operation" to a state of "in operation", the operation instruction unit 453 transmits a time correction switching notification to the ground wireless device 200 to notify the ground wireless device 200 that the time correction function is enabled. That is, the operation instruction unit 453 transmits, to the ground wireless device 200, the time correction switching notification including information indicating that the time correction is enabled.

Also, even when the operating state of the entire system is "in operation", if it is determined from the traffic operation information set 461 that now is a period of time during which a ground-to-vehicle communication function is unnecessary in the ground wireless device 200, the operation instruction unit 453 transmits a time correction switching notification including information indicating that the time correction is disabled to the ground wireless device 200 and disables the time correction function. The ground-to-vehicle communication said herein refers to communication between the ground wireless device 200 and the on-board wireless device 300. For example, in a case where the entire system is in the operating state but there is a period of time during which the train does not travel in a section in which the ground wireless device 200 is installed, the determination unit 452 of the condition monitoring device 400 determines that the ground-to-vehicle communication function is unnecessary in this period of time. When the period of time in which the ground-to-vehicle communication function is unnecessary ends, the operation instruction unit 453 transmits the time correction switching notification including the information indicating that the time correction is enabled, to thereupon enable the time correction function of the ground wireless device 200.

Figure 12:
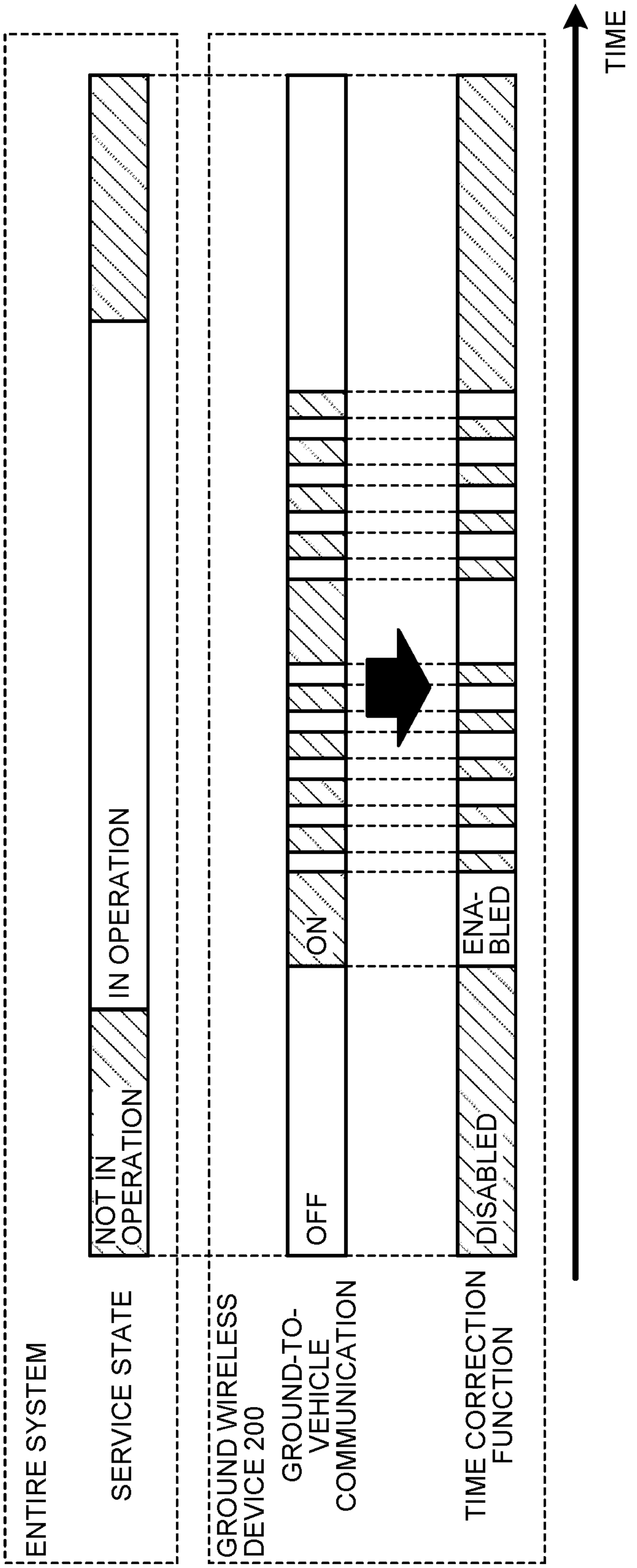
FIG. 12 is a diagram illustrating an example of a setting result of a time correction function based on a traffic operation state in the ground wireless device.

FIG. 12 illustrates an example of the state of the time correction function of the ground wireless device 200 obtained by the above-described procedure. As illustrated in FIG. 12, the time correction function is enabled in periods of time in which the ground-to-vehicle communication is "ON". As just described, the operation instruction unit 453 of the condition monitoring device 400 instructs the ground wireless device 200 to cause the ground wireless device 200 to disable the time correction function in the period of time in which the ground wireless device 200 does not communicate with the on-board wireless device 300. Note that FIG. 12 is a diagram illustrating an example of a setting result of the time correction function based on the service state in the ground wireless device 200.

Figure 13:
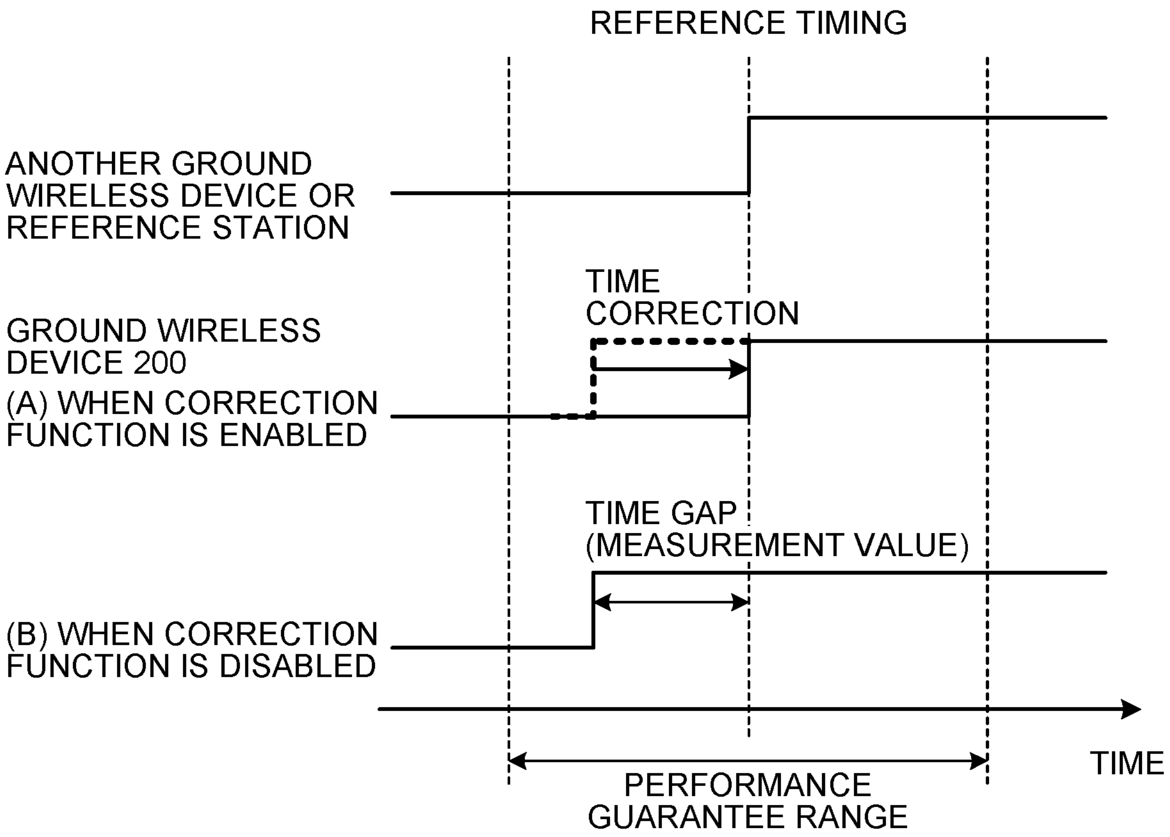
FIG. 13 is a diagram illustrating an example of a time correction operation performed by the ground wireless device.

FIG. 13 is a diagram illustrating an example of a time correction operation performed by the ground wireless device 200. As illustrated in FIG. 13, in a case where the time correction switching notification received from the condition monitoring device 400 indicates that the time correction function is enabled ((A) in FIG. 13), the ground wireless device 200 performs time correction with respect to a reference timing. The reference timing is an absolute time obtained using a GPS or the like, a timing generated on the basis of the absolute time, a transmission timing of a control signal by the other one of the ground wireless devices, or the like. In the time correction operation, for example, in a case where the reference timing is the absolute time, the time management unit 256 of the ground wireless device 200 corrects the managed internal time to match the absolute time. In a case where the reference timing is the transmission timing of the control signal by the other one of the ground wireless devices, the time management unit 256 of the ground wireless device 200 corrects the managed internal time so that the signal transmission timing generated on the basis of the internal time within the ground wireless device 200 matches the reference timing. Note that a performance guarantee range illustrated in FIG. 13 is a range in which the operation for the wireless communication system is guaranteed, and a risk of occurrence of a communication failure increases when the time gap falls outside this range.

Moreover, in a case where the time correction switching notification received from the condition monitoring device 400 indicates that the time correction function is disabled ((B) in FIG. 13), the ground wireless device 200 measures the time gap. Specifically, the signal measurement unit 252 of the ground wireless device 200 measures the time gap on the basis of a difference between the timing obtained by periodically monitoring the signal transmission timing of the other one of the ground wireless devices and the signal transmission timing of the radio transmission/reception unit 251 of the ground wireless device 200. The ground wireless device 200 transmits a result of measurement of the time gap to the condition monitoring device 400. The signal measurement unit 252 of the ground wireless device 200 can measure the time gap with respect to each of the ground wireless devices by switching the ground wireless device subjected to the measurement.

Next, a description will be provided of an example of an overall operation of the wireless train control system in a state where the time correction function of the ground wireless device is disabled.

Figure 14:
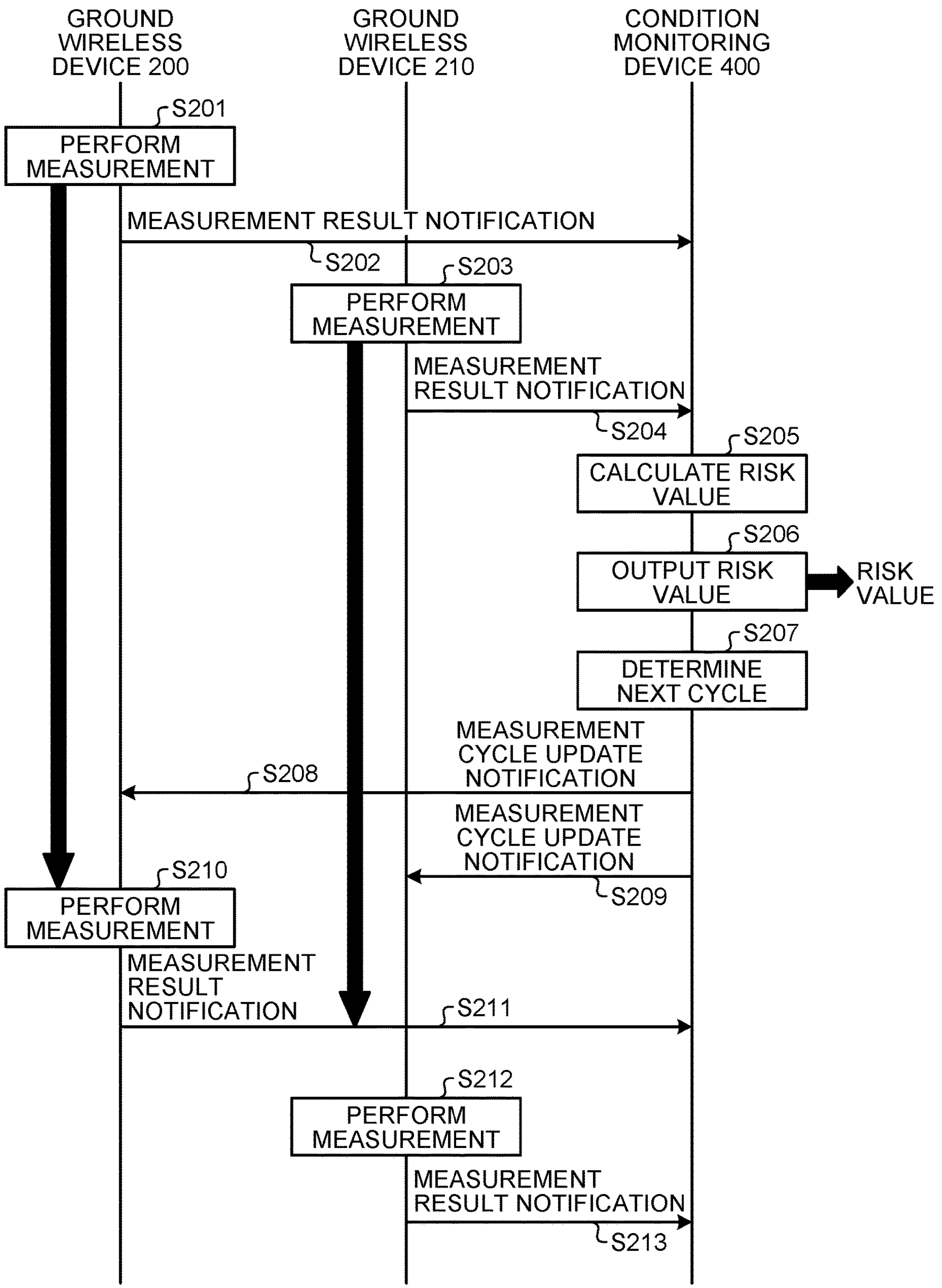
FIG. 14 is a sequence diagram illustrating an example of an overall operation of the wireless train control system in a state where the time correction function of the ground wireless device is disabled.

FIG. 14 is a sequence diagram illustrating an example of the overall operation of the wireless train control system in the state where the time correction function of the ground wireless device is disabled. Note that although FIG. 14 illustrates only the ground wireless devices 200 and 210, the ground wireless devices 220 and 230 are assumed to be present as well.

In the case where the time correction function is disabled, the ground wireless device 200 measures a difference between the signal transmission timing of each of the ground wireless devices 210 to 230 and the signal transmission timing of the ground wireless device 200 (step S201). Next, the ground wireless device 200 notifies the condition monitoring device 400 of the measured timing difference as a measurement result notification (step S202). Note that the transmission of the timing difference to the condition monitoring device 400 may be performed each time the measurement is made, the transmission of the differences thereto may be performed collectively after the measured timing differences are accumulated for a determined period of time, or such transmission may be performed when an amount of change based on the differences reaches a determined value or more. Similarly, the ground wireless device 210 measures a difference between the signal transmission timing of each of the other ground wireless devices and the signal transmission timing of the ground wireless device 210, and notifies the condition monitoring device 400 of a result of measurement (steps S203 and S204). Similarly, the ground wireless devices 220 and 230 each measure a difference between the signal transmission timing of each of the other ground wireless devices and the signal transmission timing of a corresponding one of the ground wireless devices 220 and 230, and each notify the condition monitoring device 400 of a result of measurement.

In response to a notification of the results of measurement of the time gaps from the ground wireless devices 200 to 230, the condition monitoring device 400 calculates a risk value for each of the ground wireless devices 200 to 230 on the basis of the time gaps obtained by the notification (step S205). Specifically, the deteriorated condition determination unit 454 of the determination unit 452 calculates an amount of change per unit time, that is, a slope, from the result of measurement acquired from the ground wireless device 200 and determines the calculated value to be a risk value of the ground wireless device 200. The amount of change per unit time of the result of measurement acquired from the ground wireless device 200 is obtained with use of the result of measurement having been acquired from the ground wireless device 200 in the past. Note that the acquired result of measurement is retained as the history information set 463 in the data retention unit 456. The risk value increases in accordance with a degree of performance deterioration of the ground wireless device 200. That is, the risk value indicates a performance deteriorated condition of the ground wireless device 200. The deteriorated condition determination unit 454 calculates a risk value for each of the ground wireless devices 210 to 230 through a similar process.

After calculating the risk values, the deteriorated condition determination unit 454 compares the risk values among the ground wireless devices 200 to 230, and extracts the ground wireless device having a high risk value as a ground wireless device that has deteriorated in performance and is highly likely to experience a communication failure. The deteriorated condition determination unit 454 extracts, for example, a ground wireless device having a risk value higher than that of the other ground wireless devices. Whether or not the risk value is higher than that of the other ground wireless devices is determined according to, for example, whether or not a difference from an average of the risk values of all the ground wireless devices is larger than a predetermined threshold. The ground wireless device having the highest risk value may be extracted, or a determined number of ground wireless devices may be extracted beginning with a ground wireless device having the highest risk value. As for a method of comparison, the maximum values among the risk values of the ground wireless devices may be compared with each other, or the average values of the risk values may be compared with each other. Alternatively, the deteriorated condition determination unit 454 may compare the risk values of the ground wireless devices with a predetermined threshold and extract a ground wireless device having a risk value larger than the threshold. The threshold may be a value common to all the ground wireless devices 200 to 230, or may be a value set individually for each ground wireless device.

The deteriorated condition determination unit 454 outputs information on a ground wireless device extracted, from the output unit 455 to the outside (step S206). An example of the operation of the output unit 455 includes an operation of outputting the information as a screen that is displayed on a display unit (not illustrated) of the condition monitoring device 400. Moreover, the information to be outputted by the output unit 455 may include, in addition to identification information of the ground wireless device, information on a recommended maintenance time of the ground wireless device or information on a replacement timing of the device. That is, the deteriorated condition determination unit 454 may derive the recommended maintenance time or replacement timing of the ground wireless device extracted. The recommended maintenance time and the replacement timing of the ground wireless device are derived by, for example, preparing a correspondence table of risk values and recommended maintenance times in advance and comparing the risk value calculated in step S205 with the correspondence table. When the replacement timing of the ground wireless device is obtained, the number of times of maintenance performed in the past may be taken into consideration. For example, when the number of times of maintenance performed has reached a specified value, the deteriorated condition determination unit 454 determines the replacement timing by comparing the risk value with the correspondence table. The deteriorated condition determination unit 454 records the results of measurement acquired in steps S202 and S204, and the like in the history information set 463, and uses the results of measurement for calculation of a risk value when a new result of measurement is acquired.

Next, the operation instruction unit 453 determines a cycle in which the ground wireless devices 200 to 230 are supposed to perform measurement next on the basis of the risk values calculated by the deteriorated condition determination unit 454 in step S205 (step S207). The cycle said herein is a cycle in which each ground wireless device measures a difference between the signal transmission timing of each of the other ground wireless devices and the signal transmission timing of its own ground wireless device. The operation instruction unit 453 determines the cycle individually for each ground wireless device. The operation instruction unit 453 elongates the cycle for the ground wireless device having a small amount of change in the risk value, but shortens the cycle for the ground wireless device having a large amount of change in the risk value.

The operation instruction unit 453 notifies each ground wireless device of the determined cycle by a measurement cycle update notification via the wired connection unit 451 (steps S208 and S209). The ground wireless devices including the ground wireless devices 200 and 210 each measure a difference between the signal transmission timing of each of the other ground wireless devices and the signal transmission timing of its own ground wireless device (steps S210 and S212), on a cycle obtained by the notification, and each notify the condition monitoring device 400 of a result of measurement (steps S211 and S213). Note that a configuration may be adopted in which the operation instruction unit 453 does not make a notification of a cycle to a ground wireless device for which a cycle does not need to be changed and each ground wireless device that has not received a notification of a cycle continues to operate on a predetermined cycle or on the same cycle as the last time.

As described above, in the wireless train control system according to the first embodiment, the condition monitoring device 400 instructs the ground wireless device that is not scheduled to communicate with the on-board wireless device 300 to disable the time correction, and determines the deteriorated condition of each ground wireless device, that is, calculates the risk value indicating the risk of occurrence of a communication failure in each ground wireless device, on the basis of differences in the signal transmission timing with respect to the other ground wireless devices, measured by the ground wireless device having a state where the time correction is not performed. The condition monitoring device 400 specifies a period of time in which each ground wireless device does not perform communication with the on-board wireless device 300 on the basis of the traffic operation information set 461 of the train. The wireless train control system according to the present embodiment can secure a long period in which each of the ground wireless devices 200 to 230 monitors the transmission timing of the other ground wireless devices, and can collect information for determining a failure risk due to a secular change. In addition, the use of the risk values determined by the condition monitoring device 400 can save labor for formulating plans, securing replacements, and the like for on-site maintenance and device replacement of the ground wireless devices 200 to 230.

Note that, in the present embodiment, each ground wireless device measures the difference between the transmission timing of its own ground wireless device and the transmission timing of each of the other ground wireless devices and transmits the result of measurement to the condition monitoring device 400, but may measure a difference between the internal time and the absolute time in the case where information on the absolute time can be acquired. The information on the absolute time may be acquired using the GPS described above, or may be distributed to each ground wireless device by the condition monitoring device 400, for example. Alternatively, a configuration may be adopted in which the condition monitoring device 400 generates a reference timing signal common within the system and distributes the reference timing signal to each ground wireless device, and each ground wireless device measures the amount of gap in the internal time using the reference timing signal. In a case where the ground wireless device measures the amount of gap in the internal time using the absolute time or the reference timing common within the system, the condition monitoring device 400 can determine the deteriorated condition of the ground wireless device with higher accuracy.

In addition, in the present embodiment, the risk value is calculated on the basis of the result of measurement in the state where the time synchronization function of the ground wireless device is disabled, but disabling the time synchronization function is not essential. Since the time gap per unit time increases with the performance deterioration of the device, the risk value described above can be calculated using, for example, the time gap caused between when first time synchronization is performed and when second time synchronization is performed next.

Furthermore, in the present embodiment, the description has been based on the assumption that the measurement value reported to the condition monitoring device 400 by each ground wireless device is the information on the timing difference, but a similar effect can be obtained by using signal received powers of signals received from the other ground wireless devices instead of the timing difference.

Second Embodiment

In the wireless train control system according to the first embodiment, the determination unit 452 of the condition monitoring device 400 compares the risk values calculated from the results of measurement acquired from the ground wireless devices 200 to 230 to extract a ground wireless device that is highly likely to have a communication failure. On the other hand, the present embodiment will describe a method of calculating risk values by weighting measurement values measured between the ground wireless devices on a travel path of the train 110, thereby preferentially extracting a ground wireless device having a significant risk for the switching of the ground wireless device to which the on-board wireless device 300 is connected, or for the handover thereof. Note that a configuration of the wireless train control system is similar to that of the first embodiment (see FIG. 1). Also, functional configurations and hardware configurations of the ground wireless devices 200 to 230, the on-board wireless device 300, and the condition monitoring device 400 are similar to those of the first embodiment (see FIGS. 2 to 10).

What is different from the first embodiment is an operation in which the deteriorated condition determination unit 454 in the determination unit 452 of the condition monitoring device 400 calculates the risk values of the ground wireless devices 200 to 230. Therefore, the present embodiment will mainly describe the operation in which the deteriorated condition determination unit 454 calculates the risk values. Note that the operations of the ground wireless devices 200 to 230 and the on-board wireless device 300 are similar to those in the first embodiment.

Figures 15, 16:
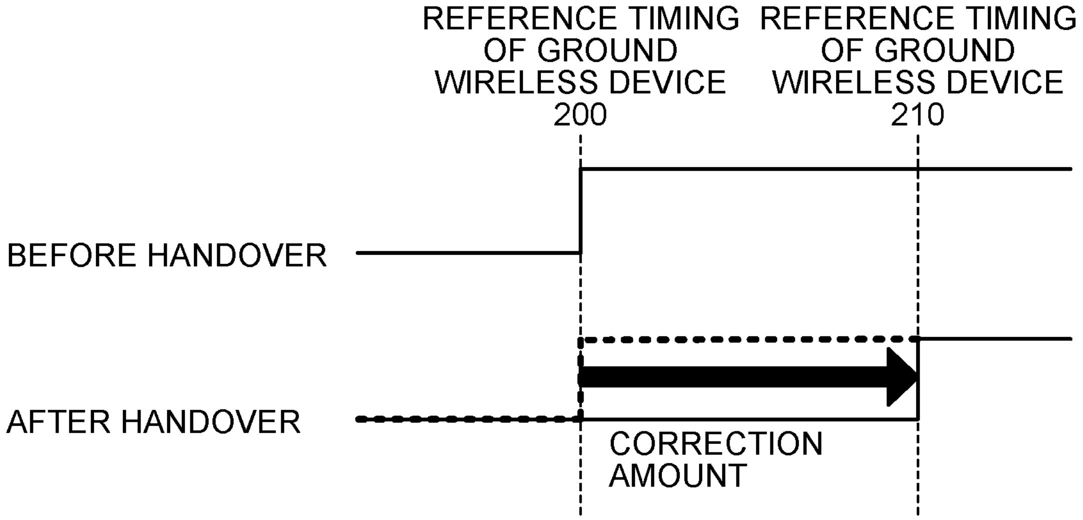
FIG. 15 is a table illustrating an example of path information retained by a condition monitoring device according to a second embodiment.
FIG. 16 is a diagram illustrating an example of a correction operation on a reference timing, performed by an on-board wireless device according to a third embodiment.

FIG. 15 illustrates a configuration of the path information set 462 retained in the data retention unit 456 used by the condition monitoring device 400 according to a second embodiment. FIG. 15 is a table illustrating an example of the path information set 462 retained by the condition monitoring device 400 according to the second embodiment. In FIG. 15, what is registered in the "path information set" is an identifier of a ground wireless device adjacent to a ground wireless device indicated by a ground wireless device identifier in the same row.

The ground wireless device 200 transmits information on a timing difference measured by the signal measurement unit 252 to the condition monitoring device 400 by a measurement result notification. For example, the ground wireless device 200 sets d_200_210 as the timing difference measured with respect to the ground wireless device 210, d_200_220 as the timing difference measured with respect to the ground wireless device 220, and d_200_230 as the timing difference measured with respect to the ground wireless device 230, and transmits the set ones to the condition monitoring device 400.

In the determination unit 452 of the condition monitoring device 400, the deteriorated condition determination unit 454 refers to the path information set 462 of FIG. 15 when calculating the risk values from the amounts of change of the timing differences d_200_210 to d_200_230 received respectively from the ground wireless devices 200 to 230. From the path information set 462, it can be found that the ground wireless device 210 is on the path of the ground wireless device 200, and these two ground wireless devices are adjacent to each other on one and the same path and are used for the handover of the on-board wireless device 300. In this situation, a weight w1 representing that path information is available between the ground wireless devices 200 and 210. That is, the deteriorated condition determination unit 454 multiplies d_200_210 by w1. On the other hand, it can be found that no handover is performed between the ground wireless devices 200 and 220 and between the ground wireless devices 200 and 230. Therefore, for these combinational cases, the deteriorated condition determination unit 454 uses a weight w2 representing that path information is unavailable. That is, the deteriorated condition determination unit 454 multiplies each of d_200_220 and d_200_230 by w2. In this example, the two weights used for weighting have a relationship of "w1>w2". The deteriorated condition determination unit 454 calculates the risk values in a method similar to that in the first embodiment using the weighted timing differences. The deteriorated condition determination unit 454 also records the weighted timing differences in the history information set 463 and uses the weighted timing differences for calculation of the risk value when a new result of measurement is acquired.

As described above, when calculating the risk values on the basis of the amounts of change of the timing differences measured by the ground wireless devices, the condition monitoring device 400 according to the second embodiment weights the measurement values (timing differences) measured between the ground wireless devices situated on the travel path of the train, thereby making it possible to preferentially extract a ground wireless device having a significant risk for the switching of the ground wireless device to which the on-board wireless device 300 is connected, or the handover thereof. By this means, it is possible to save labor for formulating plans, securing replacements, and the like for on-site maintenance and device replacement of the ground wireless devices, and also to realize prioritization thereof.

Third Embodiment

In the first and second embodiments, the risk values are calculated on the basis of the results of measurement measured between the ground wireless devices. On the other hand, in the present embodiment, description is given for a method in which the condition monitoring device 400 calculates a risk value on the basis of a difference between a signal transmission timing of the ground wireless device 200 measured by the on-board wireless device 300 and a timing generated by the radio transmission/reception unit 351 within the on-board wireless device 300. Note that a configuration of the wireless train control system is similar to that of the first embodiment (see FIG. 1). Also, functional configurations and hardware configurations of the ground wireless devices 200 to 230, the on-board wireless device 300, and the condition monitoring device 400 are substantially the same as those of the first embodiment (see FIGS. 2 to 10).

In the present embodiment, description is mainly provided of parts that are different from the first and second embodiments, specifically, operations of the on-board wireless device 300 and the condition monitoring device 400. Note that the operations of the ground wireless devices 200 to 230 are similar to those in the first embodiment.

The train 110 equipped with the on-board wireless device 300 travels on the track 100 toward the ground wireless device 200. In order to maintain communication with the ground wireless device 200, the on-board wireless device 300 monitors a signal from the ground wireless device 200 and corrects the internal time on the basis of a signal transmission timing of the ground wireless device 200 to time-synchronize with the ground wireless device 200.

In the communication coverage area of the ground wireless device 200, the signal measurement unit 352 of the on-board wireless device 300 can receive a signal from the ground wireless device 200 and measure a timing difference with respect to the ground wireless device 200. The signal measurement unit 352 of the on-board wireless device 300 transmits a timing difference d_300_200 with respect to the ground wireless device 200 as a result of measurement of the on-board wireless device 300 to the condition monitoring device 400 via the ground wireless device 200. The transmission to the condition monitoring device 400 may be performed every time the measurement is made, may be performed collectively after the timing differences are accumulated for a determined period of time, or may be performed when the amount of change therein reaches a determined value or more.

After passing through the ground wireless device 200, the train 110 equipped with the on-board wireless device 300 performs a handover operation for switching the connection destination to the ground wireless device 210. At the time of the handover, as illustrated in FIG. 16, the on-board wireless device 300 corrects a reference timing generated by the radio transmission/reception unit 351 of the on-board wireless device 300 to a reference timing of the ground wireless device 210 to which the handover is made. The reference timing of the ground wireless device 210 can be obtained by monitoring a control signal transmitted by the ground wireless device 210. The signal measurement unit 352 transmits a correction amount in the correction of the reference timing at the time of the handover as a timing difference d_300_200-210 between the ground wireless devices 200 and 210 to the condition monitoring device 400 via the ground wireless device 210. Similarly, an on-board wireless device installed in another train (not illustrated) transmits a timing difference obtained at the time of a handover operation between a ground wireless device from which the handover originates and a ground wireless device to which the handover is made, to the condition monitoring device 400.

The deteriorated condition determination unit 454 of the condition monitoring device 400 calculates risk values on the basis of the timing difference d_300-200 between the on-board wireless device 300 and the ground wireless device 200 and the timing difference d_300_200-210 between the ground wireless device 200 and the ground wireless device 210, each of the timing differences being acquired from the on-board wireless device 300. At this time, the risk values calculated by the deteriorated condition determination unit 454 are a risk value for the combination of the on-board wireless device 300 and the ground wireless device 200 and a risk value for the combination of the ground wireless device 200 and the ground wireless device 210. For example, the deteriorated condition determination unit 454 calculates the amount of change per unit time of the timing difference d_300-200 and a variation per unit time of the timing difference d_300_200-210, and sets each of these two amounts of change as the risk value. Similarly, for a combination of another on-board wireless device (not illustrated) and a ground wireless device, the deteriorated condition determination unit 454 calculates a risk value on the basis of a timing difference acquired.

The deteriorated condition determination unit 454 compares the risk values among the combinations of the on-board wireless devices and the ground wireless devices in the system, and extracts a combination having a high risk value as a combination of the on-board wireless device and the ground wireless device which is highly likely to experience a communication failure. As for a method of the comparison, as described in the first embodiment, the maximum values among the risk values for the combinations may be compared with each other, or average values of the risk values for the combinations may be compared with each other. Alternatively, the risk values (for example, average values) for the combinations may be compared with a predetermined threshold, and a combination having the risk value larger than the threshold may be extracted as a combination that is highly likely to experience a communication failure.

Moreover, the deteriorated condition determination unit 454 records the results of measurement acquired from the on-board wireless devices in the history information set 463, and uses the results of measurement for calculation of the risk value when a result of measurement is newly acquired.

Note that although not described, each ground wireless device executes the operation described in the first embodiment, and the condition monitoring device 400 executes the operation described in the first or second embodiment in addition to the operation described in the present embodiment to calculate the risk value for each ground wireless device.

As described above, the condition monitoring device 400 according to the third embodiment calculates the risk values for the combinations of the on-board wireless device and two of the ground wireless devices which are connection destinations before and after the handover, on the basis of a timing difference with respect to the ground wireless device path connected before the handover and a timing difference between the two ground wireless devices that are connection destinations before and after the handover, the timing differences being measured by the on-board wireless device at the time of the handover. By so doing, it is possible to save labor for formulating plans, securing replacements, and the like for maintenance of the on-board wireless device and replacement of the on-board wireless device, in addition to achievement of an advantageous effect obtained by the first and second embodiments.

The condition monitoring device according to the present disclosure has an advantageous effect that it is able to extract a device that requires maintenance associated with the secular change in the wireless train control system.

The configurations described in the above embodiments just illustrate examples, each of which can be combined with other publicly known techniques, and the embodiments can be combined with each other. In addition, the configurations can each be partially omitted and/or modified without departing from the scope of the present disclosure.

What is claimed is:

1. A condition monitoring device that monitors conditions of ground wireless devices and an on-board wireless device which constitute a wireless train control system adopting a time-division multiplexing scheme, the condition monitoring device comprising:

a wired connection circuit to acquire a result of measurement of an error between a transmission timing of a signal in the ground wireless device and a reference timing, from the ground wireless device; and a deteriorated condition determination circuit to determine a performance deteriorated condition of the ground wireless device, on the basis of the error, wherein the ground wireless device has an internal time used to determine the transmission timing, and a time correction function of correcting the internal time in order to synchronize the transmission timing with the reference timing, and the deteriorated condition determination circuit determines the performance deteriorated condition based on the error measured by the ground wireless device while in a state where the time correction function is disabled.

2. The condition monitoring device according to claim 1, comprising an operation instruction circuit to, in a period of time in which the ground wireless device does not communicate with the on-board wireless device, issue an instruction to disable the time correction function of the ground wireless device.

3. The condition monitoring device according to claim 2, wherein the operation instruction circuit determines a cycle on which the ground wireless device measures the error next, on the basis of a result of determination of the performance deteriorated condition obtained by the deteriorated condition determination circuit, and notifies the ground wireless device of the cycle determined.

4. The condition monitoring device according to claim 1, wherein the deteriorated condition determination circuit extracts, on the basis of the error, a ground wireless device in which a communication failure is more highly likely to occur.

5. The condition monitoring device according to claim 1, wherein the reference timing is a timing based on an absolute time.

6. The condition monitoring device according to claim 1, wherein a range is provided in which one of the ground wireless devices by which the error is measured can monitor a signal, and the reference timing is a signal transmission timing of the other of the ground wireless device located in the range.

7. The condition monitoring device according to claim 6, wherein the deteriorated condition determination circuit weights the error on the basis of a positional relationship between the ground wireless devices, and determines the performance deteriorated condition using the error weighted.

8. The condition monitoring device according to claim 7, wherein the deteriorated condition determination circuit performs weighting so that a weight on an error of the internal time between two ground wireless devices adjacent on a path on which a train travels is increased.

9. A condition monitoring device that monitors conditions of ground wireless devices and an on-board wireless device which constitute a wireless train control system adopting a time-division multiplexing scheme, the condition monitoring device comprising:

a wired connection circuit to acquire a result of measurement of an error between a transmission timing of a signal in the ground wireless device and a reference timing, from the ground wireless device; and a deteriorated condition determination circuit to determine a performance deteriorated condition of the ground wireless device, on the basis of the error, wherein the deteriorated condition determination circuit extracts, on the basis of the error, a ground wireless device in which a communication failure is more highly likely to occur, and the deteriorated condition determination circuit extracts a ground wireless device in which an amount of change per unit time of the error is larger than a predetermined threshold.

10. A condition monitoring device that monitors conditions of ground wireless devices and an on-board wireless device which constitute a wireless train control system adopting a time-division multiplexing scheme, the condition monitoring device comprising:

a wired connection circuit to acquire a result of measurement of an error between a transmission timing of a signal in the ground wireless device and a reference timing, from the ground wireless device; and a deteriorated condition determination circuit to determine a performance deteriorated condition of the ground wireless device, on the basis of the error, wherein the deteriorated condition determination circuit extracts, on the basis of the error, a ground wireless device in which a communication failure is more highly likely to occur, and the deteriorated condition determination circuit compares amounts of change per unit time of the error between the ground wireless devices and extracts a ground wireless device having the amount of change larger than that of the other of the ground wireless devices.

11. A condition monitoring device that monitors conditions of ground wireless devices and an on-board wireless device which constitute a wireless train control system adopting a time-division multiplexing scheme, the condition monitoring device comprising:

a wired connection circuit to acquire a result of measurement of an error between a transmission timing of a signal in the ground wireless device and a reference timing, from the ground wireless device; and a deteriorated condition determination circuit to determine a performance deteriorated condition of the ground wireless device, on the basis of the error the wired connection circuit acquires, from the on-board wireless device, a result of measurement of an error between a transmission timing of a signal in the on-board wireless device and a transmission timing of a signal in the ground wireless device that is under connection with the on-board wireless device, and a result of measurement of an error, when the on-board wireless device performs a handover, between a transmission timing of a signal in the ground wireless device that is a connection destination of the on-board wireless device before the handover is performed and a transmission timing of a signal in the ground wireless device that is a connection destination of the on-board wireless device after the handover is performed, and the deteriorated condition determination circuit determines a performance deteriorated condition of the on-board wireless device on the basis of the error acquired from the on-board wireless device by the wired connection unit.

* * * * *